(12) United States Patent
Mercadal et al.

(10) Patent No.: US 7,000,883 B2
(45) Date of Patent: Feb. 21, 2006

(54) METHOD AND APPARATUS FOR STABILIZING PAYLOADS, INCLUDING AIRBORNE CAMERAS

(75) Inventors: Mathieu Mercadal, Hood River, OR (US); Andreas H. von Flotow, Hood River, OR (US)

(73) Assignee: The Insitu Group, Inc., Bingen, WA (US)

( * ) Notice: Subject to any disclaimer, the term of this patent is extended or adjusted under 35 U.S.C. 154(b) by 48 days.

(21) Appl. No.: 10/742,578

(22) Filed: Dec. 18, 2003

(65) Prior Publication Data

US 2004/0173726 A1 Sep. 9, 2004

Related U.S. Application Data

(60) Provisional application No. 60/440,977, filed on Jan. 17, 2003.

(51) Int. Cl.
*F16M 13/00* (2006.01)
(52) U.S. Cl. .......................... 248/660; 396/428
(58) Field of Classification Search .............. 248/660, 248/550, 637; 396/428, 13, 12
See application file for complete search history.

(56) References Cited

U.S. PATENT DOCUMENTS

| | | | | |
|---|---|---|---|---|
| 3,085,354 A | * | 4/1963 | Rasmussen et al. | 434/31 |
| 3,567,163 A | * | 3/1971 | Kepp et al. | 244/3.14 |
| 3,638,502 A | | 2/1972 | Leavitt et al. | |
| 4,643,539 A | | 2/1987 | Brignall | |
| 4,728,839 A | * | 3/1988 | Coughlan et al. | 310/112 |
| 4,736,218 A | * | 4/1988 | Kutman | 396/427 |
| 4,989,466 A | | 2/1991 | Goodman | |
| 5,088,818 A | * | 2/1992 | Nicholson | 356/139.08 |
| 5,184,521 A | | 2/1993 | Tyler | |
| 5,347,910 A | | 9/1994 | Avila et al. | |
| 5,383,645 A | * | 1/1995 | Pedut et al. | 248/637 |
| 5,589,901 A | * | 12/1996 | Means | 396/12 |
| 5,897,223 A | | 4/1999 | Tritchew | |

(Continued)

FOREIGN PATENT DOCUMENTS

| | | |
|---|---|---|
| WO | WO-04/067432 | 8/2004 |
| WO | WO-04/068403 | 8/2004 |
| WO | WO-04/102473 | 11/2004 |

OTHER PUBLICATIONS

Nettmann Systems International, Gyron DSG (Dual Sensor Gyro Stabilized Gimbal Positioning Video Cameral), Internet, pp. 1-4.*

(Continued)

*Primary Examiner*—Anita M. King
(74) *Attorney, Agent, or Firm*—Perkins Coie, LLP (57) ABSTRACT

Methods and apparatuses for stabilizing payloads, including airborne cameras, are disclosed. In one embodiment, the apparatus employs a gimbal system in which the camera is mounted, together with suitable motors for pointing the camera by actuating this gimbal system and suitable sensors for deriving a signal to drive these gimbal motors. The gimbal axes can be arranged in a sequence that can provide for camera stabilization while reducing complexity, avoiding gimbal lock, increasing redundancy and enhancing performance.

46 Claims, 6 Drawing Sheets

U.S. PATENT DOCUMENTS

| | | | |
|---|---|---|---|
| 5,954,310 A * | 9/1999 | Soldo et al. ............... 248/660 |
| 5,967,458 A | 10/1999 | Williams et al. | |
| 6,323,898 B1 | 11/2001 | Koyanagi et al. | |
| 6,424,804 B1 * | 7/2002 | Johnson et al. ............ 396/12 |
| 6,672,535 B1 | 1/2004 | Brunner et al. | |
| 6,798,984 B1 | 9/2004 | Antikidis | |
| 6,820,531 B1 * | 11/2004 | Cianciolo ............... 89/41.02 |
| 6,849,980 B1 * | 2/2005 | Voigt et al. ............... 310/112 |
| 2003/0155463 A1 * | 8/2003 | Cox et al. ................. 244/3.1 |

OTHER PUBLICATIONS

U.S. Appl. No. 10/758,684, Andreas H. von Flotow.
U.S. Appl. No. 10/726,334, Andreas H. von Flotow.
International Search Report for PCT/US04/00931; May 13, 2005; Applicant: The Insitu Group (3 Pages).
Wu, Y.A., "EO target Geolocation Determination," proceedings of the 34th conference on decision & Control, New Orleans, LA, Dec. 1995, pp. 2766-2771, Jul. 1995 IEEE.

* cited by examiner

METHOD AND APPARATUS FOR STABILIZING PAYLOADS, INCLUDING AIRBORNE CAMERAS

CROSS-REFERENCE TO RELATED APPLICATION

The present application claims priority to pending U.S. Provisional Application No. 60/440,977, filed Jan. 17, 2003 and incorporated herein in its entirety by reference.

TECHNICAL FIELD

The present invention relates generally to methods and apparatuses for stabilizing payloads, including airborne cameras.

BACKGROUND

Unmanned aircraft or air vehicles (UAVs) provide enhanced and economical access to areas where manned flight operations are unacceptably costly and/or dangerous. For example, unmanned aircraft outfitted with remotely controlled cameras can perform a wide variety of surveillance missions, including spotting schools of fish for the fisheries industry, monitoring weather conditions, providing border patrols for national governments, and providing military surveillance before, during and/or after military operations.

To perform a surveillance mission, an unmanned aircraft typically carries a remotely operated movable camera. If not stabilized, the pointing direction of the airborne camera swings about as the aircraft maneuvers. Standard practice is to mount such a camera within a gimbal system, and drive the gimbals such that the camera's pointing axis is stabilized. Such an approach can deliver high-quality stabilized pointing, but typically leads to large, heavy, mechanical systems for support of the airborne camera. Such systems are the subject of U.S. Pat. No. 5,897,223, U.S. Pat. No. 3,638,502, U.S. Pat. No. 4,989,466, U.S. Pat. No. 4,643,539 and U.S. Pat. No. 5,184,521.

To fully stabilize an airborne camera typically requires at least three axes of gimbal freedom. Each of the above-mentioned patents describes such a 3-axis system, while U.S. Pat. No. 5,897,223 also describes a 2-axis system. Even with three axes of gimbal freedom, stabilization is degraded in some pointing directions. This occurs when two of the mechanical axes become co-linear, and is known as "gimbal lock." Stabilization performance can degrade markedly when operating near this "gimbal-locked" configuration. In FIG. 1A of U.S. Pat. No. 5,897,223, for example, gimbal lock can occur when the "horizon" axis is rotated to ±90 degrees from the configuration drawn. FIG. 1B of the same U.S. Pat. No. 5,897,223 depicts a 2-axis gimbal system in which stabilization of the outer axes can be degraded whenever the pointing direction is toward the flight vehicle nadir.

To avoid this degradation in stabilization, existing systems have included additional axes of stabilization internal to the large-motion gimbal axes. One drawback associated with this approach is that the additional inner axes can increase the weight, size, complexity and power consumption of the entire stabilization system.

DETAILED DESCRIPTION

The present disclosure describes support systems for payloads, including cameras, which can be incorporated into an aircraft, including an unmanned aircraft. Many specific details of certain embodiments of the invention are set forth in the following description and in FIGS. 1–6 to provide a thorough understanding of these embodiments. One skilled in the art, however, will understand that the present invention may have additional embodiments, and that the invention may be practiced without several of the details described below.

Aspects of the present invention include an apparatus for stabilizing the pointing direction of an airborne camera. The apparatus can include a gimbal system in which the camera is mounted, together with suitable motors for pointing the camera by actuating the gimbal system, and suitable sensors for producing a signal to drive the gimbal motors. Further aspects of the invention can include a sequence of actuations about the gimbal axes that achieve camera stabilization. This actuation sequence can reduce system complexity, avoid gimbal lock, and provide enhanced redundancy and performance.

Still further aspects of the present invention can include a camera mounted to a gimbal system that includes two gimbal axes with large travel ranges, augmented by a single inner axis with a smaller range of travel. The axes can be arranged as pan (outer) over tilt (intermediate) over scan (inner). The scan axis can be arranged so that it is parallel to the pan axis when the payload is pointed horizontally (e.g., when the camera points straight ahead). When the payload points to aircraft nadir (e.g., when the camera points downward), the scan axis can enable stabilization which is otherwise not possible with a two-axis system, due to gimbal lock.

One feature of the foregoing arrangement is that it can result in a very compact construction of a stabilized gimbal system for an airborne camera. Advantages of this arrangement can include reduced size, weight, complexity and power requirements.

As described above, a gimbal arrangement in accordance with an embodiment of the invention can provide for redundant actuation when the tilt axis points the camera line-ofsight horizontally. In this configuration, the pan and scan axes are parallel or collinear. This redundancy gradually diminishes to zero as the tilt axis points the line-of-sight to the nadir. In one aspect of this embodiment, motion along the pan axis can be slaved to motion along the scan axis, such that pan actuator moves with a (relatively) slower frequency response to keep the scan gimbal angle near zero. This approach allows the use of a less agile and less precise pan actuator, which can perform a "flip" through 180 degrees about the pan axis whenever the target passes through or near the nadir. In a further embodiment, the use of a (relatively) less agile, less precise pan actuator can allow the gimbal system to carry a pan-actuated weather enclosure without the additional cost, weight and complexity penalties typically associated with an additional actuator for this enclosure.

Figure 1:
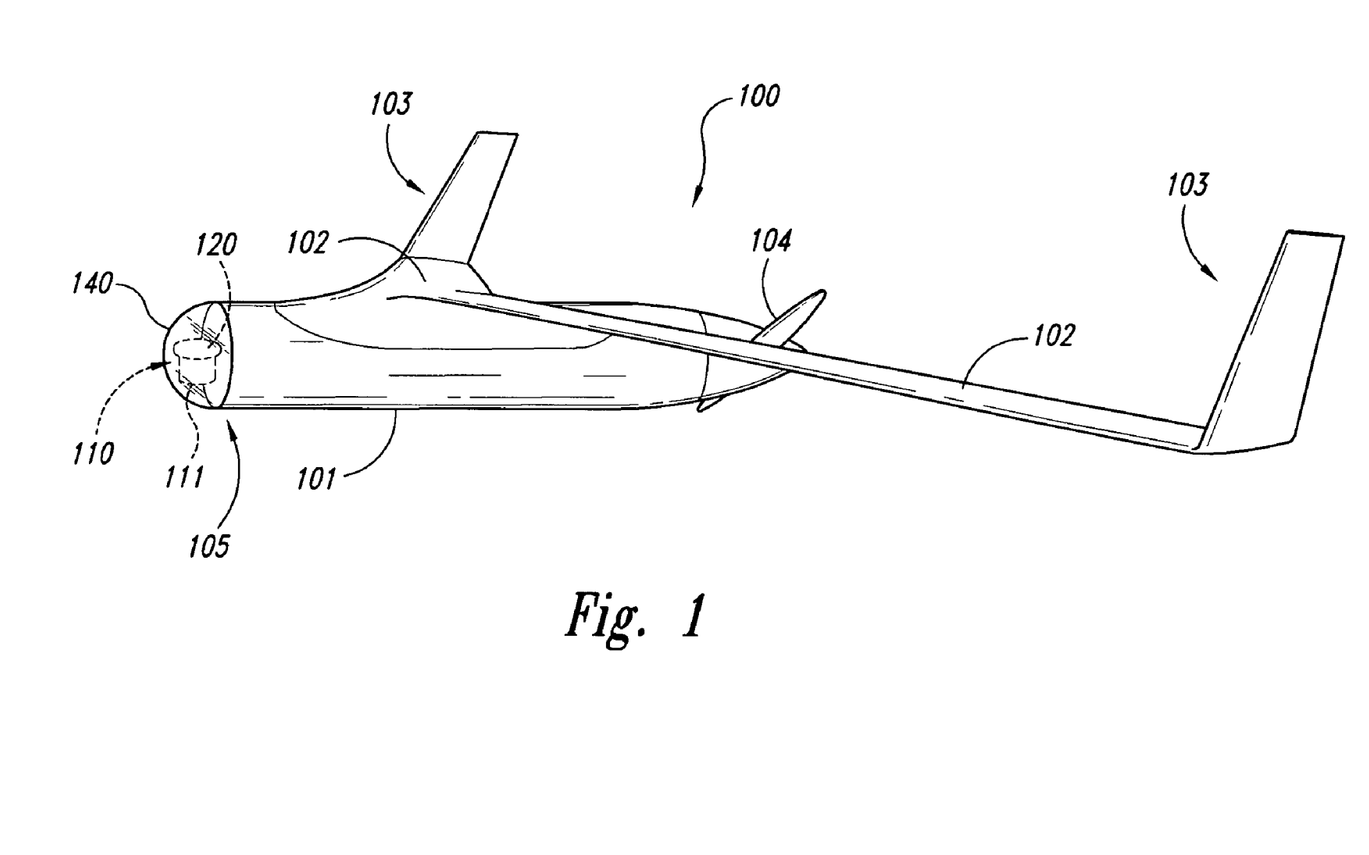
FIG. 1 illustrates an aircraft having a camera configured and installed in accordance with an embodiment of the invention.

FIG. 1 is a partially schematic, isometric view of an unmanned aircraft 100 configured to support an airborne apparatus 110 in accordance with an embodiment of the invention. In one aspect of this embodiment, the unmanned aircraft 100 can include a fuselage 101, a pair of wings 102 extending outwardly from the fuselage 101, and a propeller 104 positioned at the aft end of the fuselage 101 to propel the aircraft 100 during flight. Each wing 102 can include an upwardly extending winglet 103 for lateral stability and control.

The apparatus 110 can include a camera 111 or other payload supported by a gimbal apparatus 120. The apparatus 110 can be positioned behind a surveillance dome 140 in a nose portion 105 of the aircraft 100. The camera 111 can move relative to the aircraft 100 to acquire and/or track a target located on the ground, at sea, or in the air. Further details of the ways the gimbal apparatus 120 controls the motion of the camera 111 are described below with reference to FIGS. 2A–6.

Figure 2A:
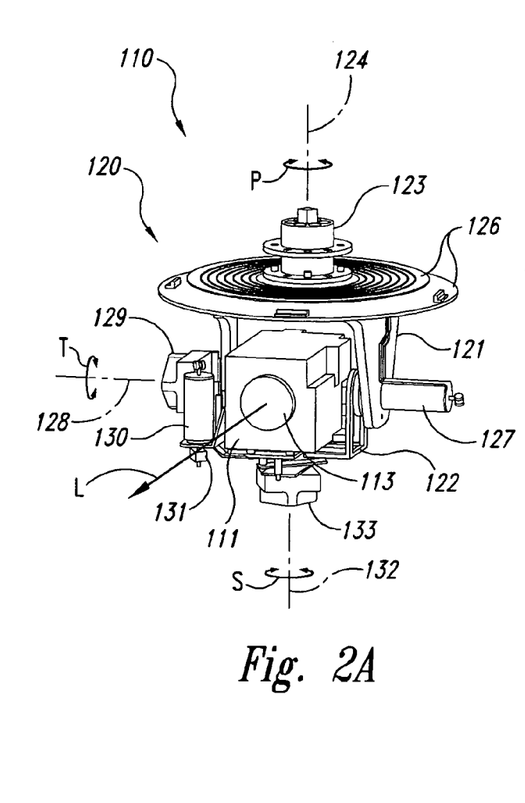
FIGS. 2A–2C illustrate a camera mounted to a gimbal system that pans in accordance with an embodiment of the invention.

FIG. 2A is a partially schematic, isometric illustration of an apparatus 110 generally similar to that shown schematically above in FIG. 1. As described above, the apparatus 110 can include the camera 111 supported by the gimbal apparatus 120. In one embodiment, the gimbal apparatus 120 can include a first support or carriage 121 which carries a second support or cradle 122. The camera 111 can be carried by the cradle 122. As described in greater detail below, the gimbal apparatus 120 can be configured to move the camera 111 about three axes relative to the aircraft 100 (FIG. 1).

In one aspect of an embodiment shown in FIG. 2A, the carriage 121 can be coupled to a pan actuator 123 for rotation about a pan rotation axis 124, as indicated by arrow "P." The cradle 122 can be coupled to a tilt actuator 127 for rotation about a tilt rotation axis 128, as indicated by arrow "T." The tilt actuator 127 can be supported by the carriage 121 and can accordingly move with the carriage 121 as the carriage 121 pans. The gimbal apparatus 120 can further include a scan actuator 130 that is operatively coupled to the camera 111 with a crank 131 or other linkage. The scan actuator 130 can rotate the camera 111 relative to the cradle 122 about a scan rotation axis 132, as indicated by arrow "S." In one embodiment, the actuators 123, 127, 130 can include AM1524-A motors, available from MicroMo Electronics, Inc. of Clearwater, Fla. In other embodiments, the actuators 123, 127, 130 can include other devices.

The camera 111 can include a camera aperture 113 having a line of sight "L." In one embodiment, the camera 111 can include a video camera configured to capture images formed by radiation in the visible spectrum. For example, the camera 111 can include a model FCB 780, available from Sony Corp. of Tokyo, Japan. In other embodiments, the camera 111 can be configured to capture images formed by radiation having other wavelengths, for example, infrared images. For example, the camera 111 can include an infrared unit available from Indigo Systems Corp. of Santa Barbara, Calif. or a Cam-Noir™ unit available from Irvine Sensors Corp. of Costa Mesa, Calif. In still further embodiments, the camera 111 can include a still camera and/or can be configured to capture still images. The image captured by the camera 111 can be stored on board the aircraft 100 and/or transmitted to a remote location, for example, a ground or sea based monitor.

In any of the foregoing embodiments, the motion of the camera 111 relative to the aircraft 100 can have at least two aspects. In one aspect, the camera 111 can move so as to acquire a target or track the target once the target is acquired. This motion tends to be relatively deliberate, as the aircraft 100 typically does not undergo extreme maneuvers while acquiring or tracking a target.

Another aspect of the camera's motion is directed toward keeping the image recorded by the camera 111 relatively stable, despite relatively high-frequency perturbations that the camera 111 may experience. These perturbations may be due to wind gusts, turbulence, vibrational motion of the aircraft 100 caused by its propulsion system, and/or other sources. To correct jitters and/or other image noise resulting from such perturbations, the camera 111 can be stabilized relative to two perpendicular axes by the motions of at least two of the actuators. For example, in one embodiment, the tilt actuator 127 and the scan actuator 130 can move at relatively high frequencies to account for relatively high frequency perturbations experienced by the camera 111. The pan actuator 123 can be configured to impart a relatively lower frequency motion to the camera 111. For example, in one embodiment, the scan actuator 130 and the tilt actuator 127 can have a closed loop bandwidth frequency of about 5 Hz, and the pan actuator 123 can have a closed loop bandwidth frequency of about 1 Hz. In other embodiments, these actuators can have different response frequencies. In any of these embodiments, the pan actuator 123 can have a first frequency response (e.g., for target acquisition and/or tracking), and the tilt actuator 127 and the scan actuator 130 can have a second frequency response (e.g., for image stabilization), with the second frequency response higher than the first frequency response. The maximum rate for the actuators 123, 127, 130 can be the same (e.g., 90 degrees/second) or different.

In any of the foregoing embodiments, the scan rotation axis 132 can initially be parallel to the pan rotation axis 124, as shown in FIG. 2A. As the camera 111 tilts about the tilt rotation axis 128, the scan rotation axis 132 can deviate from its parallel alignment with the pan rotation axis 124. As described in greater detail below with reference to FIGS. 3A–4D, this arrangement can allow the camera 111 to acquire and track targets while accounting for high frequency perturbations over a wide range of pan and tilt angles, all with a relatively simple mechanism.

The gimbal apparatus 120 can further include gyros or other devices to track the rate at which the camera 111 rotates about the rotation axes 124, 128, and/or 132. For example, in one embodiment, the gimbal apparatus 120 can include a tilt gyro 129 configured to track the angular velocity about the tilt rotation axis 128, and a scan gyro 133 configured to track the rate at which the camera 111 rotates about the scan rotation axis 132. An optional pan gyro (not visible in FIG. 2A) can track the rate at which the camera 111 rotates about the pan rotation axis 124. In one embodiment, the gyros can include model CRS03-02 units, available from Silicon Sensing Systems of Plymouth, UK. In other embodiments, the gyros can include other devices.

Circuit boards 126 can include circuitry that provides for electrical communication between the camera 111, the gyros 129, 133, and the actuators 123, 127, and 130. The circuit boards 126 can also provide for communication between these components and other components located within the aircraft 100 (FIG. 1). Processors (not visible in FIG. 2A) can be mounted on or remote from the circuit boards 126. In one embodiment, the processors can include a master processor coupled to three individual processors, with each of the three individual processors coupled to one of the actuators 123, 127, 130. In a further aspect of this embodiment, the foregoing processors can include model MSP430 units, available from Texas Instruments of Dallas, Tex. In other embodiments, the processors can include different units and/or can be arranged in different configurations.

Figure 2B:
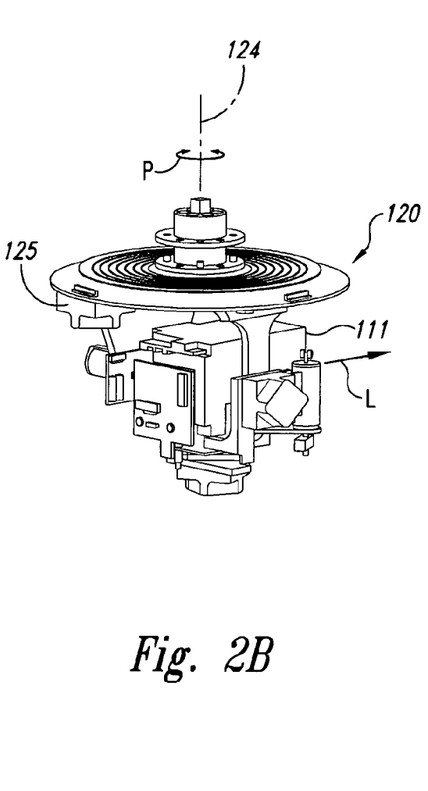

FIG. 2B illustrates the camera 111 after it has been rotated about the pan rotation axis 124 (as indicated by arrow P) such that the line of sight L is pointing in a direction different than that shown in FIG. 2A. From this angle, a pan gyro 125 (which can track the rate at which the camera 111 rotates about the pan rotation axis 124) is visible. The camera 111 can continue to rotate about the pan rotation axis 124, for example, to the orientation shown in FIG. 2C. In this orientation, further aspects of the gimbal apparatus 120, including a flexible cable 134, are visible. The flexible cable 134 can provide electrical communication to, from and among the components of the apparatus 110.

Figure 3A:
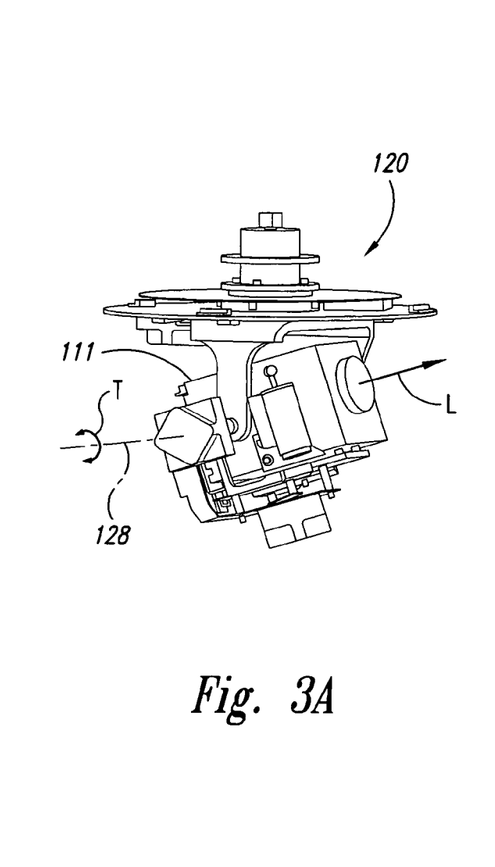
FIGS. 3A–3C illustrate the camera and gimbal system shown in FIGS. 2A–2C tilted to three different positions in accordance with an embodiment of the invention.
Figure 3B:
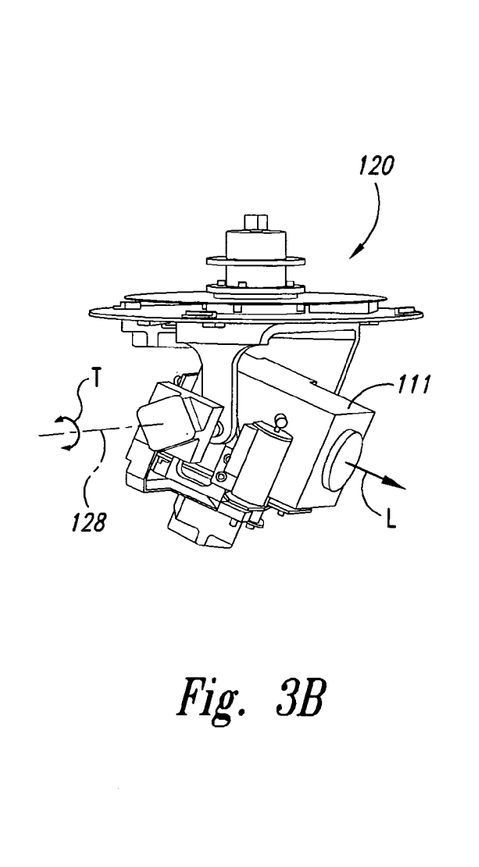
Figure 3C:
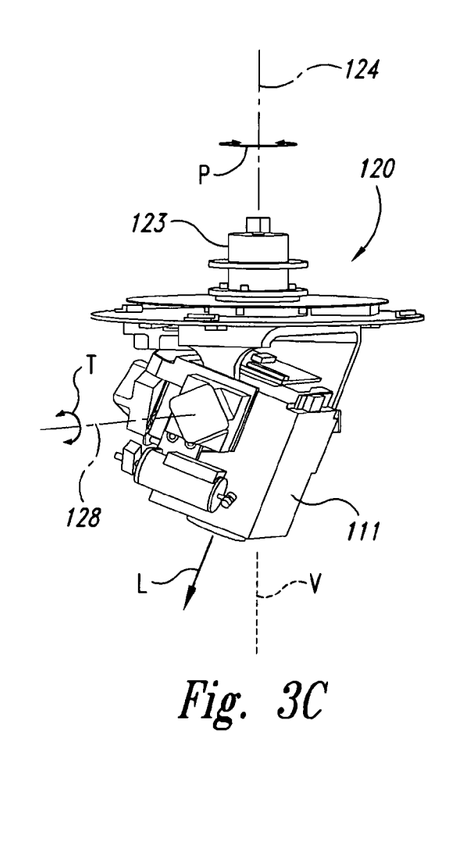

FIGS. 3A–3C illustrate the camera 111 as it rotates about the tilt axis 128 in accordance with an embodiment of the invention. Beginning with FIG. 3A, the camera 111 can be rotated about the tilt axis 128 as indicated by arrow T such that the line of sight L points upwardly, for example, if the aircraft 100 (FIG. 1) is in a dive or is tracking an airborne target. If the aircraft 100 pitches up, or if the target begins to pass beneath the aircraft, the camera 111 can tilt downwardly about the tilt rotation axis 128, as shown in FIG. 3B, such that the line of sight L points downwardly. As the aircraft 100 passes over the target, the line of sight L can pass through the vertical (as indicated by dashed line V in FIG. 3C) so that it is pointing backwards, still toward the target. As the line of sight L passes through the vertical, the camera 111 can rotate 180° about the pan rotation axis 124 (as indicated by arrow P) from the orientation shown in FIG. 3C so that the resulting image transmitted by the camera 111 does not appear upside down to the viewer. The camera 111 can then continue to tilt away from the vertical axis V as the aircraft 100 flies away from the target, with the transmitted image positioned upright. In a further aspect of this embodiment, the camera 111 can automatically rotate 180° about the pan rotation axis 124. For example, a sensor on the shaft of the tilt actuator 127 (FIG. 1A) can detect when line of sight L of the camera 111 passes through the vertical, and can transmit instructions (e.g., via the processors described above) to the pan actuator 123 to execute the 180° rotation. An advantage of this arrangement is that it can reduce the operator's workload by automatically performing an operation that would otherwise be performed manually.

Figure 4A:
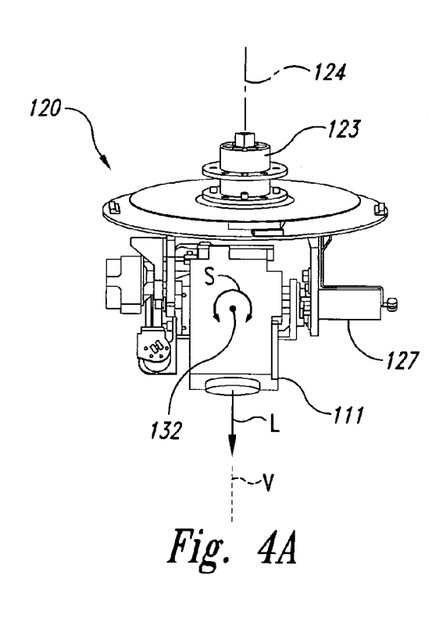
FIGS. 4A–4C illustrate the camera and gimbal system shown in FIGS. 2A–2C scanned to three different positions in accordance with an embodiment of the invention.
Figure 4B:
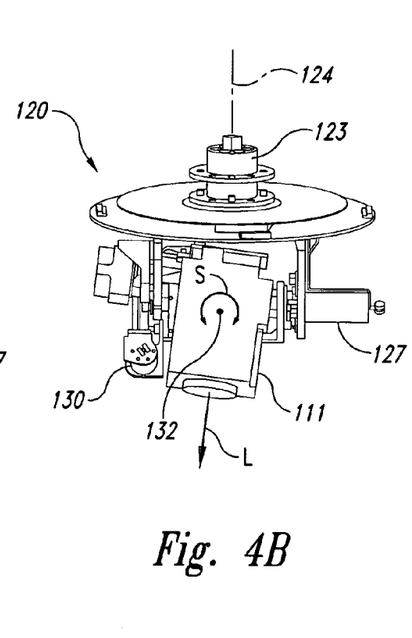
Figure 4C:
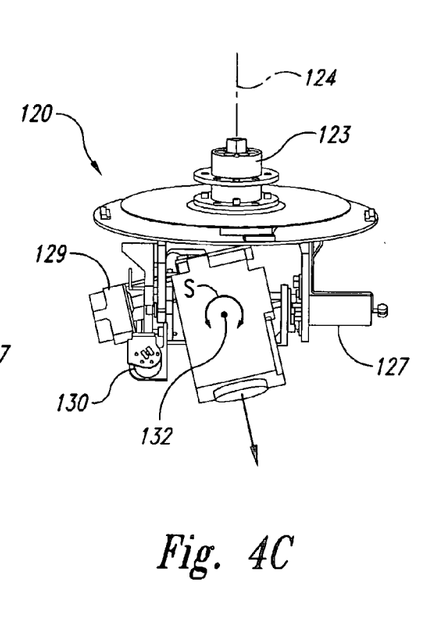
Figure 4D:
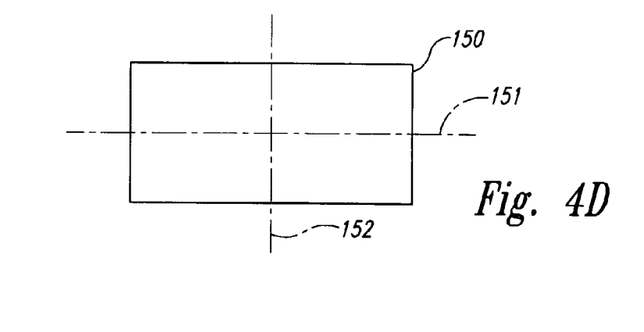
FIG. 4D is a partially schematic illustration of a camera image aligned relative to two perpendicular axes in accordance with an embodiment of the invention.

FIGS. 4A–4C illustrate the camera 111 as it rotates about the scan rotation axis 132 (perpendicular to the plane of FIGS. 4A–4C) in accordance with an embodiment of the invention. Beginning with FIG. 4A, the camera 111 is shown pointing at least approximately downwardly, with the line of sight L approximately aligned with the vertical V. The scan actuator 130 can rotate the camera 111 about the scan rotation axis 132 at a relatively high rate of speed, clockwise (as shown in FIG. 4B) and counterclockwise (as shown in FIG. 4C). Accordingly, the scan actuator 130 can provide relatively high frequency motion aligned with one image axis of the image provided by the camera 111. For example, as shown in FIG. 4D, an image 150 provided by the camera 111 can have a first image axis 151 and a second image axis 152. The scan actuator 130 can provide stability for the image 150 along the first image axis 151. The tilt actuator 127 can rotate (also at a relatively high rate) to move the camera 111 in a direction perpendicular to the motion direction imparted by the scan actuator 130. Accordingly, the tilt actuator 127 can provide stability for the image 150 along the second image axis 152. As a result, the scan actuator 130 and the tilt actuator 127 together can correct for high frequency perturbations experienced by the camera 111 as the aircraft 100 overflies its target. In one embodiment, the tilt gyro 129 can provide the angular rate information that the tilt actuator 127 corrects for, and the scan gyro 133 (FIG. 1A) can provide the angular rate information that the scan actuator 130 corrects for. In other embodiments, the inputs for the actuators can be provided by other sources. In any of these embodiments, the processor(s) described above can coordinate the communication to and from the actuators.

In one embodiment, the scan actuator 130 can move the camera 111 relative to the scan rotation axis 132 over a relatively limited angular range. In one aspect of this embodiment, the angular range can be ±20° (relative to the zero position shown in FIG. 4A). In other embodiments, this range can be about ±10°, or this range can have other values less than, for example, ±180° or ±90°. An advantage of this feature is that the scan actuator 130 and the crank 131 (FIG. 1A) can be relatively simple and need not drive the camera 111 at high rates through high angular ranges.

Figure 2C:
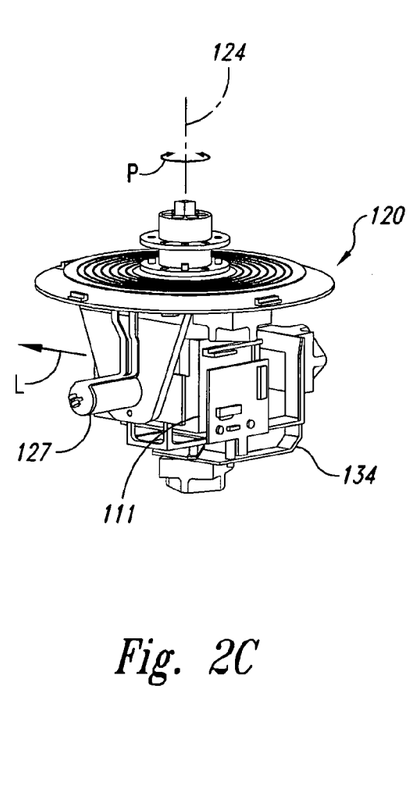

A potential drawback with the foregoing angular range arrangement is that the narrow range of angular motion about the scan rotation axis 132 can be limiting. A feature of the gimbal apparatus 120 in accordance with an embodiment of the invention can overcome this drawback. In one aspect of this embodiment, the pan actuator 123 can be slaved to the scan actuator 130. Accordingly, the pan actuator 123 can receive information about the location of the camera 111 relative to the scan rotation axis 132 (e.g., from a sensor on the shaft of the scan actuator 130) and can move to place the camera 111 in the middle of its available range of motion about the scan rotation axis 132 (i.e., at the zero position shown in FIG. 4A). For example, referring now to FIG. 2A, the pan actuator 123 can provide for coarse motion about the pan rotation axis 124, and the scan actuator 130 can provide for fine, high frequency motion about the (parallel) scan rotation axis 132. When the camera 111 is not tilted, as shown in FIGS. 2A–2C, the pan actuator 123 can rotate the camera 111 to the correct orientation for acquiring and/or tracking the target, and the scan actuator 130 and the tilt actuator 127 together can provide for relatively high frequency motion of the camera 111 along the two image axes 151, 152 (FIG. 4D) to correct for vibrations and other perturbations. As the camera 111 tilts to the orientation shown in FIGS. 4A–4C, the redundancy between the scan rotation axis 132 and the pan rotation axis 124 disappears. Accordingly, the pan actuator 123 becomes less and less able to zero the location of the camera 111 relative to the scan rotation axis 132. However, the scan actuator 130 and the tilt actuator 127 can still operate to stabilize the camera against high frequency perturbations in two perpendicular directions without encountering the "gimbal-lock" problem described above.

Figure 5A:
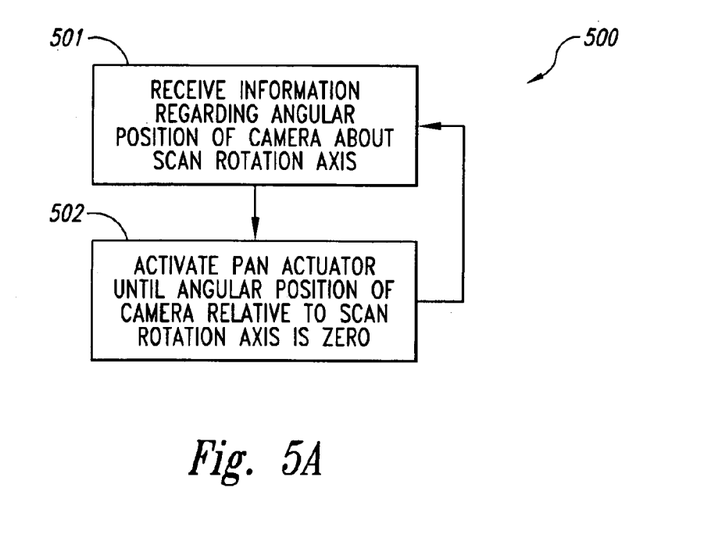
FIGS. 5A–5C are block diagrams illustrating methods for controlling camera motion in accordance with several embodiments of the invention.
Figure 5B:
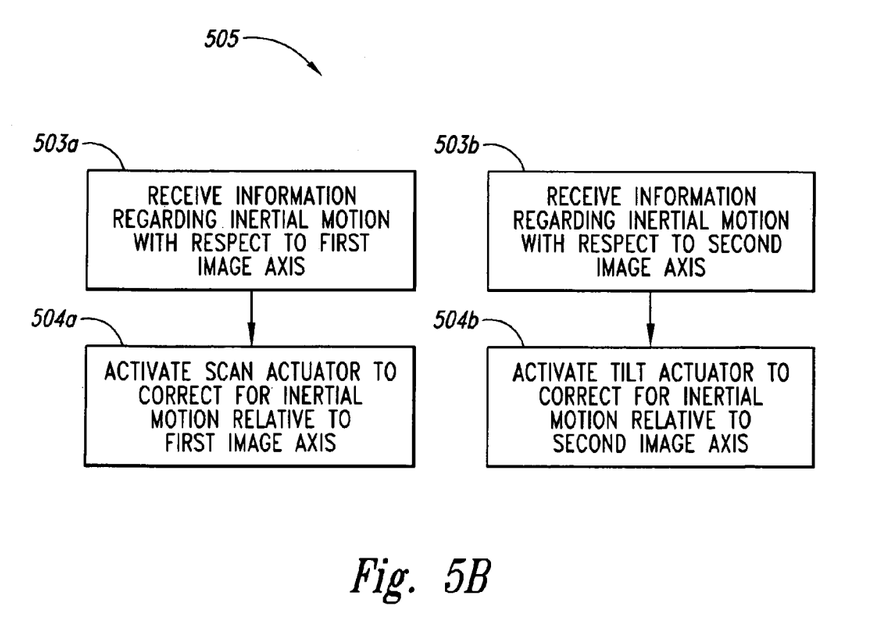
Figure 5C:
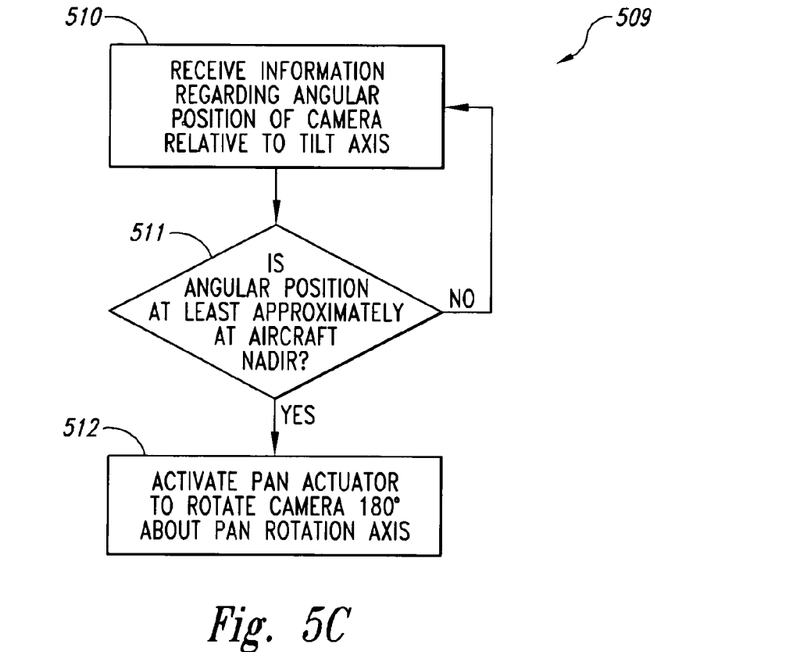

FIGS. 5A–5C illustrate methods for controlling the motion of the camera 111 described above, in accordance with several embodiments of the invention. In one aspect of these embodiments, the processes or steps may be completed by a computer or other numerical processor such as the processors described above. Referring first to FIG. 5A, a method 500 in accordance with one embodiment of the invention can include receiving information regarding the angular position of the camera about the scan rotation axis (process portion 501). In process portion 502, the pan actuator can be activated until the angular position of the camera relative to the scan axis is zero, based upon the information received in process portion 501. The process 500 can be repeated on a continual basis to realign the camera relative to the scan axis (via the pan actuator) in a slaved arrangement, as described above. The angular position of the camera about the scan rotation axis can be fed to the pan actuator, with a gain that may depend upon the current location of the camera relative to the tilt rotation axis.

Referring now to FIG. 5B, a process 505 can include stabilizing the image created by the camera in accordance with an embodiment of the invention. Process portion 503a can include receiving information regarding the inertial motion (e.g., angular rate) of the camera relative to the first image axis. This information can be received from the gyros, as described above. In process portion 504a, the scan actuator can be activated to account for the inertial motion. Accordingly, the image transmitted by the camera can be stabilized with respect to the first image axis. Process portion 503b can include receiving information regarding the inertial motion (e.g., angular rate) of the camera relative to the second image axis, and process portion 504b can include activating the tilt actuator to correct for inertial motion relative to the second image axis. Accordingly, the image transmitted by the camera can be stabilized in two perpendicular axes. One aspect of an embodiment of the process 505 shown in FIG. 5B is that the image can be stabilized in two directions, either simultaneously or sequentially, with no cross-coupling between instructions regarding motion relative to the first image axis, and instructions regarding motion relative to the second image axis.

Referring now to FIG. 5C, a process 509 in accordance with another embodiment of the invention can include rotating the camera 111 by 180° to reorient the camera image, for example, as the aircraft overflies its target. Process portion 510 can include receiving information regarding the angular position of the camera relative to the tilt axis. Process portion 511 can include determining whether the angular position relative to the tilt axis is approximately at the aircraft nadir. If not, the process can return to process portion 510. If so, process portion 512 can include activating the pan actuator to rotate the camera by 180° relative to the pan rotation axis.

In one embodiment, aspects of the methods described above with reference to FIGS. 5A–5C can be combined. For example, one process can include checking the angular position of the camera relative to the scan rotation axis, while simultaneously checking the position of the camera relative to the tilt rotation axis. The pan actuator can be activated simultaneously to both zero the position of the camera relative to the scan rotation axis, and invert the camera relative to the pan rotation axis to keep the camera image upright.

Figure 6:
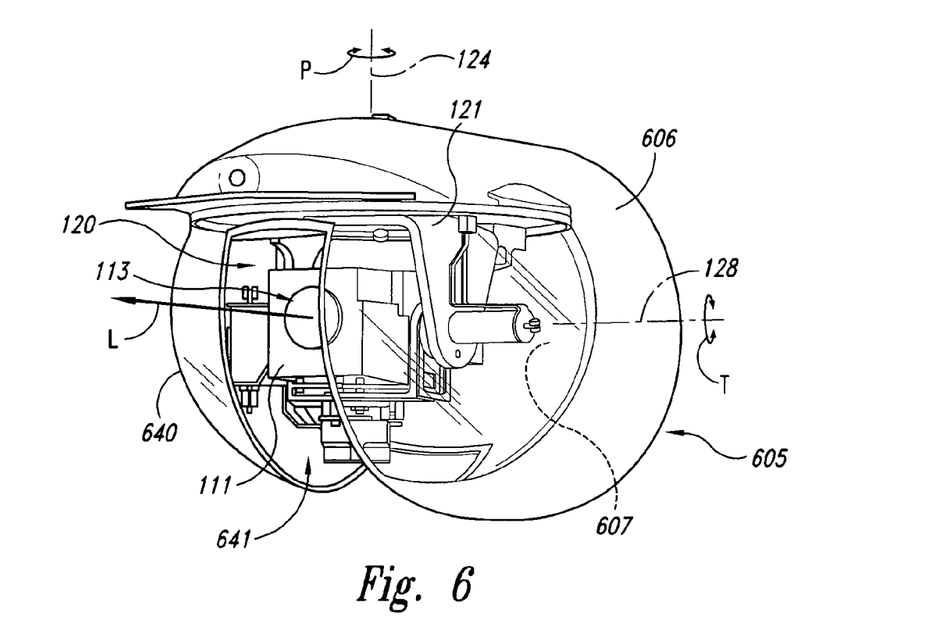
FIG. 6 illustrates a camera mounted to a gimbal system that carries a pan-actuated, protective enclosure in accordance with an embodiment of the invention.

FIG. 6 is a partially schematic, isometric illustration of a portion of the aircraft 100 described above with reference to FIG. 1, having an aircraft nose 605 configured in accordance with another embodiment of the invention. In one aspect of this embodiment, the aircraft nose 605 can include a conical section 606 having a forward facing concave end 607. The concave end 607 can receive a surveillance dome 640 having the general shape of a portion of a sphere. The surveillance dome 640 can be operatively coupled to the carriage 121 of the gimbal apparatus 120 (or directly to the pan actuator 123 shown in FIG. 2A), positioned within the surveillance dome 640. Accordingly, the surveillance dome 640 can rotate along with the carriage 121 about the pan rotation axis 124, as indicated by arrow P.

In one aspect of an embodiment shown in FIG. 6, the surveillance dome 640 can include a strip-shaped window 641 aligned with the aperture 113 of the camera 111. The window 641 can be transparent to the radiation at which the camera 111 is sensitive, while the rest of the surveillance dome 640 can be translucent and/or opaque to this radiation. For example, when the camera 111 is sensitive to infrared radiation, the window 641 can be transparent to infrared radiation. The shape of the window 641 can be configured to accommodate the motion of the line of sight L of the camera 111 as the camera 111 tilts about the tilt rotation axis 128, as indicated by arrow T.

One feature of an embodiment of the arrangement described above with reference to FIG. 6 is that the surveillance dome 640 can be configured to rotate about the pan rotation axis 124. An advantage of this feature is that the surveillance dome 640 need rotate about only one axis, and can accordingly have a relatively simple actuation scheme that "piggybacks" on the existing activation arrangement for the pan axis 124. A further advantage of this feature is that the pan axis 124 about which the surveillance dome 640 rotates need only provide relatively slow rotation, as described above with reference to FIGS. 2A–4C. Accordingly, the pan actuator 123 (FIG. 2A) need not be significantly increased in size (and therefore weight) to accommodate the motion of the surveillance dome 640.

Another feature of an embodiment of the arrangement described above with reference to FIG. 6 is that the surveillance dome 640 can include a window 641 that occupies less than the entire surface area of the surveillance dome 640. In one embodiment, the window 641 can include a physical, strip-shaped slit in the surveillance dome 640. This embodiment can be suitable for an aircraft 100 (FIG. 1) that can overcome the substantial drag increase resulting from such a configuration. In other embodiments, the window 641 can include a solid material different than the material forming the rest of the surveillance dome 640. An advantage of this arrangement is that the amount of transparent material (which can be costly) required for the surveillance dome 640 can be reduced compared with other arrangements. A further advantage is that the material forming the window 641 may be difficult to form into complex shapes. By forming the window from a single, flat, strip-shaped piece of material, the window 641 can be bent or curved in a single direction (e.g., about the tilt rotation axis 128) rather than being curved in a compound manner. In any of these embodiments, the window 641 can be formed from a single pane or multiple panes.

From the foregoing, it will be appreciated that specific embodiments of the invention have been described herein for purposes of illustration, but that various modifications may be made without deviating from the spirit and scope of the invention. For example, the payload carried by the gimbal system can include devices other than cameras, and/or the gimbal system can be mounted to platforms other than an unmanned aircraft, or unmanned aircraft having features different than those shown and described above. Features of related systems and methods are disclosed in pending U.S. Provisional Application No. 60/440,844, filed Jan. 17, 2002 and pending U.S. application Ser. No. 10/726,334 filed Dec. 1, 2003, both of which are incorporated herein in their entireties by reference. Accordingly, the invention is not limited except as by the appended claims.

We claim:

1. A gimbal apparatus, comprising:
    a first support;
    a first actuator coupled to the first support to rotate the first support about a first axis;
    a second support rotatably carried by the first support and configured to carry a tracking payload;
    a second actuator coupled to the second support to rotate the second support about a second axis transverse to the first axis;
    a third actuator carried by the second support to rotate about a third axis, the third actuator being operatively coupleable to the tracking payload to rotate the tracking payload relative to the second support, the third axis being generally parallel to the first axis when the second support is in a first angular position relative to the second axis, the third axis being non-parallel to the first axis when the second support is in a second angular position relative to the second axis; and
    wherein the first actuator is positioned to move the first support through a first angular range, the second actuator is positioned to move the second support through a second angular range, and the third actuator is positioned to move the tracking payload through a third angular range, the third angular range being less than both the first and second angular ranges.

2. The apparatus of claim 1, further comprising: a tracking payload, and wherein the tracking payload includes a camera having a line of sight and an image field, the image field having a first image axis and a second image axis transverse to the first image axis; and
    a controller operatively coupled to the first, second and third actuators and being configured to direct movement of the actuators such that:
        when the second support is in the first angular position, the first actuator moves the line of sight along the first image axis and the second actuator moves the line of sight along the second image axis; and
        when the second support is in the second angular position, the third actuator moves the line of sight along the first image axis and the second actuator moves the line of sight along the second image axis.

3. The apparatus of claim 1 wherein the first actuator is positioned to move the first support through a total angular range of about 360 degrees, the second actuator is positioned to move the second support through a total angular range of about 180 degrees, and the third actuator is positioned to move the tracking payload through a total angular range of about 20 degrees.

4. The apparatus of claim 1, further comprising a controller operatively coupled to the first, second and third actuators to direct motion of the actuators.

5. The apparatus of claim 1, further comprising a controller operatively coupled to the first, second and third actuators to direct motion of the actuators, the controller being configured to direct the first actuator to rotate the first support by 180 degrees when the second actuator rotates the tracking payload to face downwardly.

6. The apparatus of claim 1, further comprising the tracking payload, and wherein the tracking payload includes a camera.

7. The apparatus of claim 1 wherein the first actuator has a first actuation rate and the third actuator has a third actuation rate higher than the first actuation rate.

8. The apparatus of claim 1, further comprising a housing coupled to the first support to move with the first support.

9. The apparatus of claim 1 wherein the first axis includes a pan axis, the second axis includes a tilt axis and the third axis includes a scan axis.

10. The apparatus of claim 1 wherein the first actuator is configured to operate at a first maximum frequency, the second actuator is configured to operate at a second maximum frequency and the third actuator is configured to operate at a third maximum frequency, with the first maximum frequency being less than the second and third maximum frequencies.

11. The apparatus of claim 1 wherein the second and third actuators are configured to stabilize the tracking payload against vibrations.

12. The apparatus of claim 1, further comprising a controller operatively coupled to the first and third actuators, the controller being configured to automatically:
    receive a signal corresponding to a position of the third actuator relative to a range of motion for the third actuator when the first support has a first orientation;
    direct a signal to the first actuator to rotate the first support to a second orientation; and
    direct a signal to the third actuator to move toward a center of the range of motion for the third actuator while moving the first support to have a third orientation at least approximately the same as the first orientation.

13. The apparatus of claim 1 wherein at least one of the second and third actuators includes a stepper motor.

14. An airborne surveillance apparatus, comprising:
    a camera having a camera aperture configured to receive radiation along a line of sight, the camera further having an image field with a first image axis and a second image axis generally transverse to the first image axis;
    a gimbal system supporting the camera, the gimbal system including:
        a first support coupled to a first actuator to rotate about a first axis, the first actuator having a first actuation rate capability;
        a second support carried by the first support and coupled to a second actuator to rotate about a second axis transverse to the first axis, the second support carrying the camera, the second actuator having a second actuation rate capability;
        a third actuator carried by the second support to rotate about a third axis, the third actuator being operatively coupled to the camera to rotate the camera relative to the second support, the third axis being generally parallel to the first axis when the second support is in a first angular position relative to the second axis, the third axis being non-parallel to the first axis when the second support is in a second angular position relative to the second axis, the third actuator having a third actuator rate capability greater than the first actuator rate capability; and
        a controller operatively coupled to the first, second and third actuators and being configured to direct movement of the actuators such that:

when the second support is in the first angular position, the first actuator moves the line of sight along the first image axis and the second actuator moves the line of sight along the second image axis; and when the second support is in the second angular position, the third actuator moves the line of sight along the first image axis and the second actuator moves the line of sight along the second image axis.

15. The apparatus of claim 14, further comprising a housing carried by the first support to rotate with the first support, the housing having a generally strip-shaped portion aligned with the camera aperture, the generally strip-shaped portion being at least approximately transparent to the radiation.

16. An apparatus for tracking a target from the air, comprising:
first support means;
first actuation means for rotating the first support means about a first axis;
second support means carried by the first support means and configured to carry a tracking payload;
second actuation means for rotating the second support means relative to the first support means about a second axis transverse to the first axis; and
third actuation means for rotating the tracking payload about a third axis, with the third axis being generally parallel to the first axis when the second support means is in a first angular position relative to the second axis, the third axis being generally inclined relative to the first axis when the second support means is in a second angular position relative to the second axis, wherein the second and third actuation means are configured to stabilize the tracking payload against vibrations.

17. The apparatus of claim 16, further comprising a control means for controlling the first and third actuation means, the control means being configured to automatically:
receive a signal corresponding to a position of the third actuation means relative to a range of motion for the third actuation means when the first support means has a first orientation;
direct a signal to the first actuation means to rotate the first support means to a second orientation; and
direct a signal to the third actuation means to move toward a center of the range of motion for the third actuation means while moving the first support to have a third orientation at least approximately the same as the first orientation.

18. The apparatus of claim 16, further comprising:
the tracking payload, and wherein the tracking payload includes a camera having a line of sight and an image filed, the image field having a first image axis and a second image axis generally transverse to the first image axis; and
control means for directing motion of the first, second and third actuation means such that:
when the second support means is in the first angular position, the first actuation means moves the line of sight along the first image axis and the second actuation means moves the line of sight along the second image axis; and
when the second support is in the second angular position, the third actuation means moves the line of sight along the first image axis and the second actuation means moves the line of sight along the second image axis.

19. A gimbal apparatus, comprising:
a first support;
a first actuator coupled to the first support to rotate the first support about a first axis;
a second support rotatably carried by the first support and configured to carry a tracking payload;
a second actuator coupled to the second support to rotate the second support about a second axis transverse to the first axis; and
a housing carried by the first support, the housing having a generally strip-shaped window curved about a single axis, the window being positioned to pass radiation to and/or from the tracking payload.

20. The apparatus of claim 19 wherein the housing includes a curved, dome-shaped portion disposed outwardly from the window, and wherein the dome-shaped portion includes a first material and the window includes a second material different than the first material.

21. The apparatus of claim 19 wherein the window has a single radius of curvature extending outwardly from the second axis.

22. The apparatus of claim 19, further comprising the tracking payload, and wherein the tracking payload includes a camera.

23. The apparatus of claim 19, further comprising a third actuator carried by the second support to rotate about a third axis, the third actuator being operatively coupleable to the tracking payload to rotate the tracking payload relative to the second support, the third axis being generally parallel to the first axis when the second support is in a first angular position relative to the second axis, the third axis being generally inclined relative to the first axis when the second support is in a second angular position relative to the second axis.

24. A method for tracking a target from the air, comprising:
rotating a first support about a first axis by activating a first actuator;
rotating a second support relative to the first support about a second axis transverse to the first axis by activating a second actuator, the second support carrying a tracking payload; and
rotating the tracking payload about a third axis by activating a third actuator, with the third axis being generally parallel to the first axis when the second support is in a first angular position relative to the second axis, the third axis being generally inclined relative to the first axis when the second support is in a second angular position relative to the second axis, wherein rotating the tracking payload about the second and third axes includes stabilizing the tracking payload against vibrations.

25. The method of claim 24 wherein the tracking payload includes a camera having a line of sight and an image field, the image field having a first image axis and a second image axis transverse to the first image axis, and wherein the method further comprises:
when the second support is in the first angular position, activating the first actuator to move the line of sight along the first image axis and activating the second actuator to move the line of sight along the second image axis; and
when the second support is in the second angular position, activating the third actuator to move the line of sight along the first image axis and activating the second actuator to move the line of sight along the second image axis.

26. The method of claim 24 wherein rotating the tracking payload includes rotating a camera.

27. The method of claim 24 wherein rotating the tracking payload about a first axis includes rotating the tracking payload with a first actuator having a first actuation frequency response, and wherein rotating the tracking payload about a third axis includes rotating the tracking payload with a third actuator having a third actuation frequency response greater than the first actuation frequency response.

28. The method of claim 24 wherein rotating the tracking payload about the first axis includes rotating the tracking payload at a first frequency to track a target, and wherein rotating the tracking payload about the third axis includes rotating the tracking payload at a second frequency higher than the first frequency to at least partially correct for vibration of the tracking payload.

29. The method of claim 24, further comprising rotating the tracking payload 180 degrees about the first axis with the first actuator when the second actuator tilts the payload to face downwardly.

30. The method of claim 24, further comprising:
receiving a signal corresponding to a position of the third actuator relative to a range of motion for the third actuator when the first support has a first orientation;
directing a signal to the first actuator to rotate the first support to a second orientation; and
directing a signal to the third actuator to move toward a center of the range of motion for the third actuator while moving the first support to have a third orientation at least approximately the same as the first orientation.

31. A computer-implemented method for tracking a target from the air, comprising:
directing a first actuator to rotate a first support about a first axis;
directing a second actuator to rotate a second support relative to the first support about a second axis transverse to the first axis, the second support carrying a tracking payload; and
directing a third actuator to rotate the tracking payload about a third axis, with the third axis being generally parallel to the first axis when the second support is in a first angular position relative to the second axis, the third axis being non-parallel to the first axis when the second support is in a second angular position relative to the second axis, wherein rotating the tracking payload about the second and third axes includes stabilizing the tracking payload against vibrations.

32. The computer-implemented method of claim 31 wherein the tracking payload includes a camera having a line of sight and an image field, the image field having a first image axis and a second image axis transverse to the first image axis, and wherein the method further comprises:
when the second support is in the first angular position, directing the first actuator to move the line of sight along the first image axis and directing the second actuator to move the line of sight along the second image axis; and
when the second support is in the second angular position, directing the third actuator to move the line of sight along the first image axis and directing the second actuator to move the line of sight along the second image axis.

33. The computer-implemented method of claim 31, further comprising directing the first actuator to rotate the tracking payload 180 degrees about the first axis when the second actuator tilts the payload to face downwardly.

34. A method for operating an airborne camera, comprising:
launching an aircraft carrying an airborne camera;
selecting a target;
directing a viewing line of sight of the camera toward the target; and
moving the camera to maintain the viewing line of sight directed to the target as the aircraft moves relative to the target by:
activating a first actuator to pan the camera about a pan axis;
activating a second actuator to tilt the camera about a tilt axis transverse to the pan axis; and
activating a third actuator to rotate the camera about a scan axis and stabilize the camera against vibration, with the scan axis being generally parallel to the pan axis when the camera is in a first angular position relative to the tilt axis, the scan axis being generally inclined relative to the pan axis when the camera is in a second angular position relative to the tilt axis.

35. The method of claim 34 wherein the camera has an image field, the image field having a first image axis and a second image axis transverse to the first image axis, and wherein the method further comprises:
when the camera is in the first angular position, activating the first actuator to move the line of sight along the first image axis and activating the second actuator to move the line of sight along the second image axis; and
when the camera is in the second angular position, activating the third actuator to move the line of sight along the first image axis and activating the second actuator to move the line of sight along the second image axis.

36. The method of claim 34, further comprising rotating the camera 180 degrees about the pan axis as the viewing line of sight tilts through a vertical line.

37. The method of claim 34, further comprising:
receiving a signal corresponding to a position of the third actuator relative to a range of motion for the third actuator when the first support has a first orientation;
directing a signal to the first actuator to rotate the first support to a second orientation; and
directing a signal to the third actuator to move toward a center of the range of motion for the third actuator while moving the first support to have a third orientation at least approximately the same as the first orientation.

38. A gimbal apparatus, comprising:
a first support;
a first actuator coupled to the first support to rotate the first support about a first axis through a total angular range of about 360 degrees;
a second support rotatably carried by the first support and configured to carry a tracking payload;
a second actuator coupled to the second support to rotate the second support about a second axis transverse to the first axis through a total angular range of about 180 degrees; and
a third actuator carried by the second support to rotate about a third axis through a total angular range of about 20 degrees, the third actuator being operatively coupleable to the tracking payload to rotate the tracking payload relative to the second support, the third axis being generally parallel to the first axis when the second support is in a first angular position relative to the second axis, the third axis being non-parallel to the first axis when the second support is in a second angular position relative to the second axis.

39. A gimbal apparatus, comprising:
a first support;
a first actuator coupled to the first support to rotate the first support about a first axis;
a second support rotatably carried by the first support and configured to carry a tracking payload;
a second actuator coupled to the second support to rotate the second support about a second axis transverse to the first axis;
a third actuator carried by the second support to rotate about a third axis, the third actuator being operatively coupleable to the tracking payload to rotate the tracking payload relative to the second support, the third axis being generally parallel to the first axis when the second support is in a first angular position relative to the second axis, the third axis being non-parallel to the first axis when the second support is in a second angular position relative to the second axis; and
a controller operatively coupled to the first, second and third actuators to direct motion of the actuators, the controller being configured to direct the first actuator to rotate the first support by 180 degrees when the second actuator rotates the tracking payload to face downwardly.

40. A gimbal apparatus, comprising:
a first support;
a first actuator coupled to the first support to rotate the first support about a first axis, the first actuator having a first actuation rate;
a second support rotatably carried by the first support and configured to carry a tracking payload;
a second actuator coupled to the second support to rotate the second support about a second axis transverse to the first axis; and
a third actuator carried by the second support to rotate about a third axis, the third actuator having a third actuation rate higher than the first actuation rate, the third actuator being operatively coupleable to the tracking payload to rotate the tracking payload relative to the second support, the third axis being generally parallel to the first axis when the second support is in a first angular position relative to the second axis, the third axis being non-parallel to the first axis when the second support is in a second angular position relative to the second axis.

41. A gimbal apparatus, comprising:
a first support;
a first actuator coupled to the first support to rotate the first support about a first axis, the first actuator being configured to operate at a first maximum frequency;
a second support rotatably carried by the first support and configured to carry a tracking payload;
a second actuator coupled to the second support to rotate the second support about a second axis transverse to the first axis, the second actuator being configured to operate at a second maximum frequency; and
a third actuator carried by the second support to rotate about a third axis, the third actuator being configured to operate at a third maximum frequency, with the first maximum frequency being less than the second and third maximum frequencies, the third actuator being operatively coupleable to the tracking payload to rotate the tracking payload relative to the second support, the third axis being generally parallel to the first axis when the second support is in a first angular position relative to the second axis, the third axis being non-parallel to the first axis when the second support is in a second angular position relative to the second axis.

42. A gimbal apparatus, comprising:
a first support;
a first actuator coupled to the first support to rotate the first support about a first axis;
a second support rotatably carried by the first support and configured to carry a tracking payload;
a second actuator coupled to the second support to rotate the second support about a second axis transverse to the first axis; and
a third actuator carried by the second support to rotate about a third axis, the third actuator being operatively coupleable to the tracking payload to rotate the tracking payload relative to the second support, the third axis being generally parallel to the first axis when the second support is in a first angular position relative to the second axis, the third axis being non-parallel to the first axis when the second support is in a second angular position relative to the second axis, wherein the second and third actuators are configured to stabilize the tracking payload against vibrations.

43. A method for tracking a target from the air, comprising:
rotating a first support about a first axis by activating a first actuator having a first actuation frequency response;
rotating a second support relative to the first support about a second axis transverse to the first axis by activating a second actuator, the second support carrying a tracking payload; and
rotating the tracking payload about a third axis by activating a third actuator having a third actuation frequency response greater than the first actuation frequency response, with the third axis being generally parallel to the first axis when the second support is in a first angular position relative to the second axis, the third axis being generally inclined relative to the first axis when the second support is in a second angular position relative to the second axis.

44. A method for tracking a target from the air, comprising:
rotating a first support about a first axis by activating a first actuator;
rotating a second support relative to the first support about a second axis transverse to the first axis by activating a second actuator, the second support carrying a tracking payload; and
rotating the tracking payload about a third axis by activating a third actuator, with the third axis being generally parallel to the first axis when the second support is in a first angular position relative to the second axis, the third axis being generally inclined relative to the first axis when the second support is in a second angular position relative to the second axis, wherein rotating the tracking payload about the first axis includes rotating the tracking payload at a first frequency to track a target, and wherein rotating the tracking payload about the third axis includes rotating the tracking payload at a second frequency higher than the first frequency to at least partially correct for vibration of the tracking payload.

45. A method for tracking a target from the air, comprising:
rotating a first support about a first axis by activating a first actuator;

rotating a second support relative to the first support about a second axis transverse to the first axis by activating a second actuator, the second support carrying a tracking payload; and rotating the tracking payload about a third axis by activating a third actuator, with the third axis being generally parallel to the first axis when the second support is in a first angular position relative to the second axis, the third axis being generally inclined relative to the first axis when the second support is in a second angular position relative to the second axis, wherein rotating the tracking payload about the second and third axes includes stabilizing the tracking payload against vibrations.

46. A method for tracking a target from the air, comprising:

rotating a first support about a first axis by activating a first actuator;

rotating a second support relative to the first support about a second axis transverse to the first axis by activating a second actuator, the second support carrying a tracking payload; and rotating the tracking payload about a third axis by activating a third actuator, with the third axis being generally parallel to the first axis when the second support is in a first angular position relative to the second axis, the third axis being generally inclined relative to the first axis when the second support is in a second angular position relative to the second axis; and rotating the tracking payload 180 degrees about the first axis with the first actuator when the second actuator tilts the payload to face downwardly.

* * * * *